(12) United States Patent
Nagura et al.

(10) Patent No.: US 10,550,968 B2
(45) Date of Patent: Feb. 4, 2020

(54) JOINT UNIT (71) Applicant: Kobe Steel, Ltd., Hyogo (JP)

(72) Inventors: Kenji Nagura, Takasago (JP); Hitoshi Takagi, Takasago (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 145 days.

(21) Appl. No.: 15/117,542

(22) PCT Filed: Feb. 3, 2015

(86) PCT No.: PCT/JP2015/052901
§ 371 (c)(1),
(2) Date: Aug. 9, 2016

(87) PCT Pub. No.: WO2015/129396
PCT Pub. Date: Sep. 3, 2015

(65) Prior Publication Data
US 2016/0348814 A1 Dec. 1, 2016

(30) Foreign Application Priority Data
Feb. 28, 2014 (JP) .................. 2014-038879

(51) Int. Cl.
*F16L 19/02* (2006.01)

(52) U.S. Cl.
CPC ....... *F16L 19/0206* (2013.01); *F16L 19/0218* (2013.01); *F16L 2201/30* (2013.01); *Y10T 403/67* (2015.01)

(58) Field of Classification Search
CPC .............. F16L 19/0206; F16L 19/0218; F16L 2201/30; Y10T 403/67
(Continued)

(56) References Cited

U.S. PATENT DOCUMENTS 2,562,294 A * 7/1951 Cahenzli, Jr. ....... F16L 19/0218
285/353 X
3,476,414 A * 11/1969 Condrac ............. F16L 19/0206
285/354 X
(Continued)

FOREIGN PATENT DOCUMENTS

CN 2116141 U 9/1992
GB 1326445 A 8/1973
(Continued)

OTHER PUBLICATIONS

Extended European Search Report (EESR) dated Oct. 16, 2017, from corresponding EP Appl No. 15754942.9, 7 pp.
(Continued)

*Primary Examiner* — Zachary T Dragicevich
(74) *Attorney, Agent, or Firm* — Studebaker & Brackett PC (57) ABSTRACT

A joint unit includes a first joint member, a second joint member, and a gasket. The first joint member has a female screw portion. The second joint member has a second pipe portion and a second fastener. The second pipe portion has a male screw portion. The second fastener has a second fastener body and a second collar having an annular shape. The second fastener body has an external screw portion that is a male screw. The second collar has at an inner circumferential portion thereof an internal screw portion that is a female screw. The external screw portion is engaged with the female screw portion, and the male screw portion is engaged with the internal screw portion. In the joint unit, the second fastener body and the first joint member are fastened so that the second collar presses the second pipe portion toward the gasket.

8 Claims, 7 Drawing Sheets

(58) Field of Classification Search
USPC ............. 285/353, 354, 384, 13, 14; 403/342
See application file for complete search history.

(56) References Cited

U.S. PATENT DOCUMENTS

| | | | |
|---|---|---|---|
| 3,521,910 A * | 7/1970 | Callahan, Jr. | ....... F16L 19/0218 |
| | | | 285/14 |
| 4,690,436 A | 9/1987 | Hehl | |
| 5,060,987 A | 10/1991 | Miller | |
| 5,176,409 A * | 1/1993 | Brooks | ........................ 285/353 |
| 2003/0132632 A1 | 7/2003 | Schoonen | |
| 2004/0164552 A1 | 8/2004 | Karasawa | |
| 2005/0179259 A1 | 8/2005 | Sugiyama et al. | |
| 2011/0031745 A1* | 2/2011 | Nakata | ................. F16L 19/0218 |

FOREIGN PATENT DOCUMENTS

| | | |
|---|---|---|
| JP | S14-016746 Y1 | 10/1939 |
| JP | S45-008914 B1 | 3/1970 |
| JP | S45-013554 Y1 | 5/1970 |
| JP | S45-025062 B1 | 8/1970 |
| JP | S47-000611 Y1 | 1/1972 |
| JP | H01-028398 Y2 | 8/1989 |
| JP | H09-280432A A | 10/1997 |
| JP | 2002-357288 A | 12/2002 |
| JP | 2004-092915 A | 3/2004 |
| JP | 2009-275846 A | 11/2009 |

OTHER PUBLICATIONS

Notification of Transmittal of Translation of the International Preliminary Report on Patentability and English translation of the Written Opinion of the International Searching Authority; PCT/JP2015/052901 dated Sep. 15, 2016.

International Search Report issued in PCT/JP2015/052901; dated May 12, 2015.

* cited by examiner

JOINT UNIT

TECHNICAL FIELD

The present invention relates to a joint.

BACKGROUND ART

A pipe joint disclosed by Patent Literature 1 includes first and second pipe joint members of synthetic resin, an annular gasket of synthetic resin having a square section and interposed at a butting part between the joint members, an annular male screw member fitted in the second joint member, and a cap nut fitted from the side of the first joint member and screwed on the male screw member. The joint members have a prescribed equal inner diameter over their entire lengths. The joint members each include a large thickness portion positioned close to the butting part, a small thickness portion positioned away from the butting part, and a flange portion provided at the butting end of the large thickness portion. As the cap nut is fastened onto the male screw member, the male screw member presses the flange portion of the second joint member axially inwardly, and the cap nut presses the flange portion of the first joint member axially inwardly, so that the joint members are closely contacted with each other through the gasket.

In the pipe joint disclosed by Patent Literature 1, the flange portions of the first and second pipe joint members must be formed for example by cutting. In this way, the first and second pipe joint members must be subjected to processing particularly for these members, and therefore pipes connected to the first and second pipe joint members are preferably discrete members from the first and second pipe joint members. However, the pipes and the pipe joint members must be welded together particularly if high pressure fluid is to be passed through the pipe joint members, which would complicate the operation of connecting the pipes.

CITATION LIST

Patent Literature

Patent Literature 1: Japanese Unexamined Patent Publication No. 2004-092915

SUMMARY OF INVENTION

It is an object of the invention to facilitate assembling operation for a joint unit.

A joint unit according to one aspect of the present invention includes a first joint member having a first flow path and a screw portion provided at a part on an outer side than the first flow path, a second joint member having a second flow path and screwed with the first joint member, and a gasket arranged between the first joint member and the second joint member and having an opening that allows the first and second flow paths to communicate with each other, the second joint member includes: a second pipe portion having the second flow path therein; and a second fastener having a tubular shape arranged on an outer side of the second pipe portion, the second fastener includes: a second fastener body having an external thread portion engaged with the screw portion of the first joint member; and a second collar having an annular shape and positioned closer to the first joint member than an end of the second fastener body positioned away from the first joint member, the second collar includes an inner circumferential portion having a contact portion in contact with an outer surface of the second pipe portion and another contact portion in contact with the second fastener body in an extending direction of the second pipe portion, and the second fastener body and the first joint member are fastened, so that the second collar presses the second pipe portion toward the gasket.

A joint unit according to another aspect of the present invention includes two joint members each having a flow path, a tubular coupling portion that couples the two joint members, and a gasket positioned between the two joint members and having an opening that allows the flow paths of the two joint members to communicate with each other, the two joint members each include: a pipe portion having the flow path therein; and a tubular fastener arranged on an outer side of the pipe portion, the fastener includes: a fastener body including an outer circumferential portion having a male screw portion; and an annular collar positioned closer to the coupling portion than an end of the fastener body positioned away from the coupling portion, the collar includes an inner circumferential portion including a contact portion in contact with an outer surface of the pipe portion and another contact portion in contact with the fastener body in an extending direction of the pipe portion, the male screw portions of the two joint members are inversely threaded with respect to each other, the coupling portion includes an inner circumferential portion having a first female screw portion engaged with the male screw portion of one of the two joint members and a second female screw portion engaged with the other male screw portion, and in each of the two joint members, the fastener body and the coupling portion are fastened so that the collar presses the pipe portion toward the gasket.

DESCRIPTION OF EMBODIMENTS

Embodiments of the present invention will be described with reference to the accompanying drawings.

First Embodiment

A joint unit 1 according to a first embodiment of the present invention will be described with reference to FIG. 1.

Figure 1:
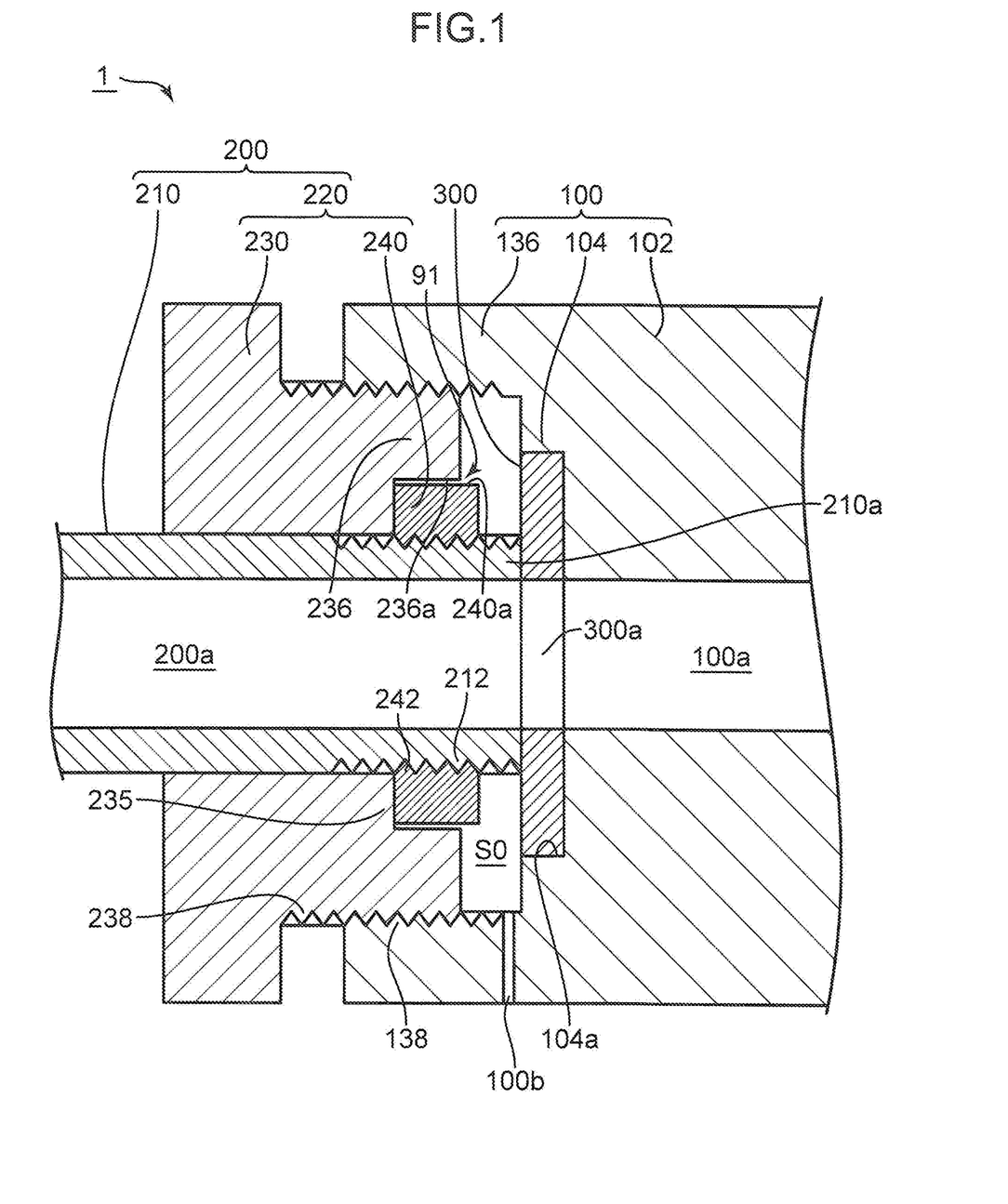
FIG. 1 is a sectional view of a joint unit according to a first embodiment of the present invention.

As shown in FIG. 1, the joint unit 1 according to the embodiment includes a first joint member 100, a second joint member 200, and a gasket 300 arranged between the first joint member 100 and the second joint member 200. A high pressure fluid (such as gas) is made to flow through the joint unit 1.

The first joint member 100 includes a tubular flow path portion 102 that forms a first flow path 100*a*, an annular step portion 104, and an attachment portion 136 having a female screw portion 138. In the following description, the extending direction of the first flow path 100a that corresponds to a left-right direction in FIG. 1 will be referred to as "the flow path direction." Note that the flow path direction coincides with the extending direction of a second pipe portion 210 that will be described.

The step portion 104 has a larger inner diameter than that of the flow path portion 102. The gasket 300 is arranged inside the step portion 104. According to the embodiment, the gasket 300 abuts against an inner circumferential surface 104a of the step portion 104 in a direction perpendicular to the flow path direction (hereinafter simply referred to as "the perpendicular direction"). More specifically, the step portion 104 serves as a position fixation portion that fixes the position of the gasket 300 in the perpendicular direction. Note that if the position of the gasket 300 in the perpendicular direction can be fixed, the inner circumferential surface 104a of the step portion 104 may be in any other shape such as a long hole shape instead of the circular shape. This also applies to other embodiments.

The attachment portion 136 is positioned on an outer side than the first flow path 100a and has a larger inner diameter than that of the step portion 104. The female screw portion 138 is formed at an inner circumferential surface of the attachment portion 136. According to the embodiment, the female screw portion 138 is formed as a right-handed screw. The attachment portion 136 is provided with a connection path 100b formed through the attachment portion 136 in the perpendicular direction (i.e., in a direction parallel to a plane perpendicular to the paper sheet plane of FIG. 1). More specifically, a space S0 formed between the first joint member 100 and the second joint member 200 is connected to the outside of the joint unit 1 through the connection path 100b.

The second joint member 200 includes a second pipe portion 210 having a second flow path 200a formed therein and a second fastener 220 in a tubular shape. The second pipe portion 210 has a male screw portion 212 provided at an outer circumferential surface of a tip end portion 210a of the second pipe portion 210 positioned close to the first joint member 100 (i.e., its right end in FIG. 1). According to the embodiment, the male screw portion 212 is a left-handed screw. The tip end portion 210a has a thickness substantially equal to those of the rest of the second pipe portion 210. The second pipe portion 210 has an inner diameter substantially equal to that of the flow path portion 102. In the flow path direction, the entire end surface of the tip end portion 210a of the second pipe portion 210 abuts against the gasket 300. The tip end portion 210a may have a sufficient thickness, and therefore fluid leakage can be prevented more surely than the case of a so-called line sealing type joint unit in which a pipe portion tapered toward its tip end abuts against the other member.

The second fastener 220 is arranged on an outer side of the second pipe portion 210. The second fastener 220 has a second fastener body 230 and a second collar 240 in an annular shape whose outer periphery forms a cylindrical surface. The second fastener body 230 has an external thread portion 238 that is a male screw provided at an outer circumference of a tip end portion 236. The external thread portion 238 is a right-handed screw and inversely threaded with respect to the male screw portion 212 of the second pipe portion 210. The second collar 240 is positioned closer to the first joint member 100 than an end of the second fastener body 230 positioned away from the first joint member 100 (i.e., the left end in FIG. 1). The second collar 240 has an internal thread portion 242 that is a female screw at its inner circumference.

At an inner circumference of the second fastener body 230, a part 236a close to the first joint member 100 has a greater diameter than the rest of the inner circumference. The second collar 240 is held inside the part 236a. The part 236a will be hereinafter referred to as "the holder 236a." In the perpendicular direction, a very small gap 91 is formed between the second collar 240 and the holder 236a. An end of the second collar 240 positioned away from the first joint member 100 is a contact portion in contact with the holder 236a in the flow path direction.

In the joint unit 1, the external thread portion 238 of the second fastener 220 is engaged with the female screw portion 138 of the first joint member 100, and the male screw portion 212 of the second pipe portion 210 is engaged with the internal thread portion 242 of the second collar 240. In this way, the first joint member 100 and the second joint member 200 are securely fastened.

The gasket 300 is held from both sides in the flow path direction by the first joint member 100 and the second pipe portion 210. The gasket 300 has an opening 300a in its center, and the opening 300a allows the first flow path 100a and the second flow path 200a to communicate with each other. The opening 300a of the gasket 300 has a diameter substantially equal to those of the flow path portion 102 and the second pipe portion 210. The gasket 300 is provided, so that the joint unit 1 is sealed between the flow path portion 102 of the first joint member 100 and the second pipe portion 210. In this way, fluid passed through the first and second flow paths 100a and 200a is prevented from leaking. In the joint unit 1, if there is fluid leakage from between the second pipe portion 210 and the gasket 300, the leaking fluid is guided to the outside of the joint unit 1 through the connection path 100b from the space S0 between the second fastener 220 and the first joint member 100. In this way, the leaking fluid is guided in a particular direction, so that checking operation for fluid leakage in the joint unit 1 can be facilitated.

Figure 2:
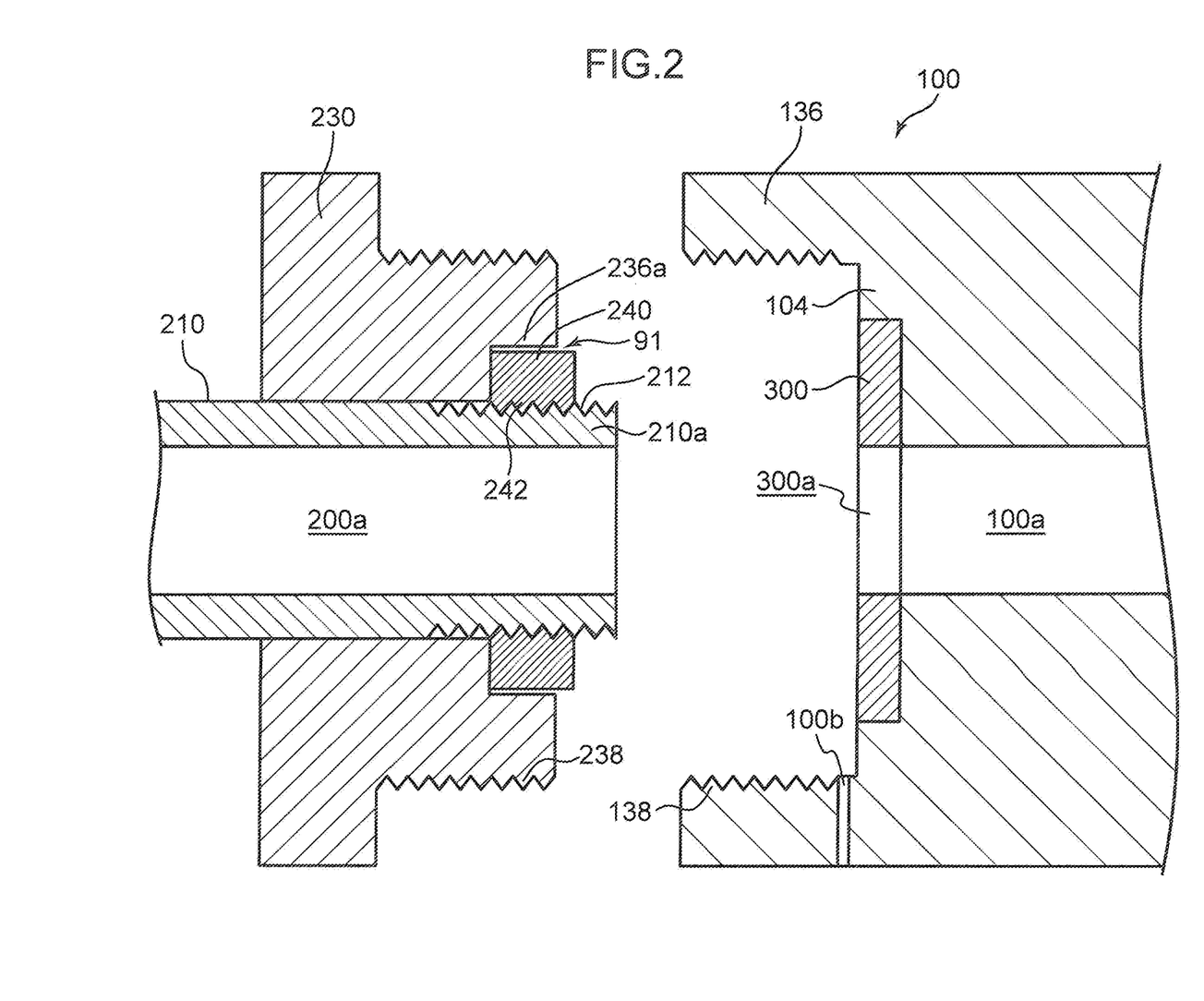
FIG. 2 is a view showing assembling of the joint unit in progress.

When the joint unit 1 is assembled, the gasket 300 is arranged inside the step 104 of the first joint member 100 as shown in FIG. 2. In parallel with the arrangement of the gasket 300 to the first joint member 100 (or before or after the arrangement), the second fastener body 230 is fitted from the tip end portion 210a of the second pipe portion 210. Then, the second collar 240 is screwed on the tip end portion 210a, and the second collar 240 is fitted in the holder 236a of the second fastener body 230.

As the second collar 240 is held by the holder 236a, the second fastener body 230 is inserted in the first joint member 100. At the time, the second fastener body 230 is rotated relatively to the attachment portion 136 in a clockwise direction as viewed from the left in FIG. 2, so that the second fastener body 230 is screwed in the first joint member 100. The holder 236a presses the second collar 240 toward the first joint member 100 in a direction parallel to the flow path direction. As shown in FIG. 1, the second collar 240 presses the second pipe portion 210 toward the gasket 300 as the internal thread portion 242 and the male screw portion 212 of the second pipe portion 210 are engaged. In this way, the second pipe portion 210, the gasket 300, and the flow path portion 102 are contacted closely with one another. The very small gap 91 is formed between the second collar 240 and the holder 236a, so that rotation force generated by the rotation of the second fastener body 230 can be inhibited from acting upon the second collar 240.

In the joint unit 1 according to the first embodiment of the present invention, the second fastener body 230 and the first joint member 100 are fastened, so that the second collar 240 presses the second pipe portion 210 toward the gasket 300. On the other hand, as disclosed by Japanese Unexamined Patent Publication No. 2004-092915, when the two pipe joint members are provided with flanges in the abutment part, and the flanges are fastened by a cap nut and a male screw, the pipe joint members are subjected to cutting process or the like in order to provide the pipe joint members with the flanges. The pipe joint members to be subjected to processing particularly for the members and pipes to be connected the members must be discrete members, and the pipe joint members and the pipes must be welded together. In contrast, in the joint unit 1, the second pipe portion 210 can be connected to the first joint member 100 without the necessity of such welding operation because the second collar 240 is provided, and therefore assembling operation for the joint unit 1 can be facilitated.

Since the second collar 240 is arranged in the holder 236a, the total length of the second joint member 200 can be reduced. The gap 91 provided between the second collar 240 and the holder 236a inhibits the rotation force of the second fastener body 230 from acting upon the second collar 240 during assembling of the joint unit 1. In addition, the male screw portion 212 and the external thread portion 238 are inversely threaded, and therefore the second collar 240 attached to the second pipe portion 210 can be prevented from being loosened if friction is caused between the holder 236a and the second collar 240. In the second collar 240, the female screw portion 242 provided at the inner circumference forms a contact portion in contact with the male screw portion 212 of the second pipe portion 210. In this way, the second collar 240 can easily press the second pipe portion 210 toward the gasket 300. Furthermore, the second collar 240 can be attached easily to the second pipe portion 210 by screw fixation. In the joint unit 1, the first joint member 100 has the step portion 104 as a position fixation portion, so that the second joint member 200 can be inserted in the first joint member 100 while the position of the gasket 300 is fixed in the perpendicular direction, so that assembling operation for the joint unit 1 can be facilitated.

Second Embodiment

Now, a joint unit 1a according to a second embodiment of the present invention will be described with reference to FIG. 3. Note that the structure of a second joint member 200 according to the second embodiment is the same as that according to the first embodiment, the same elements will be designated by the same reference characters, and a description of the second joint member 200 will not be provided.

Figure 3:
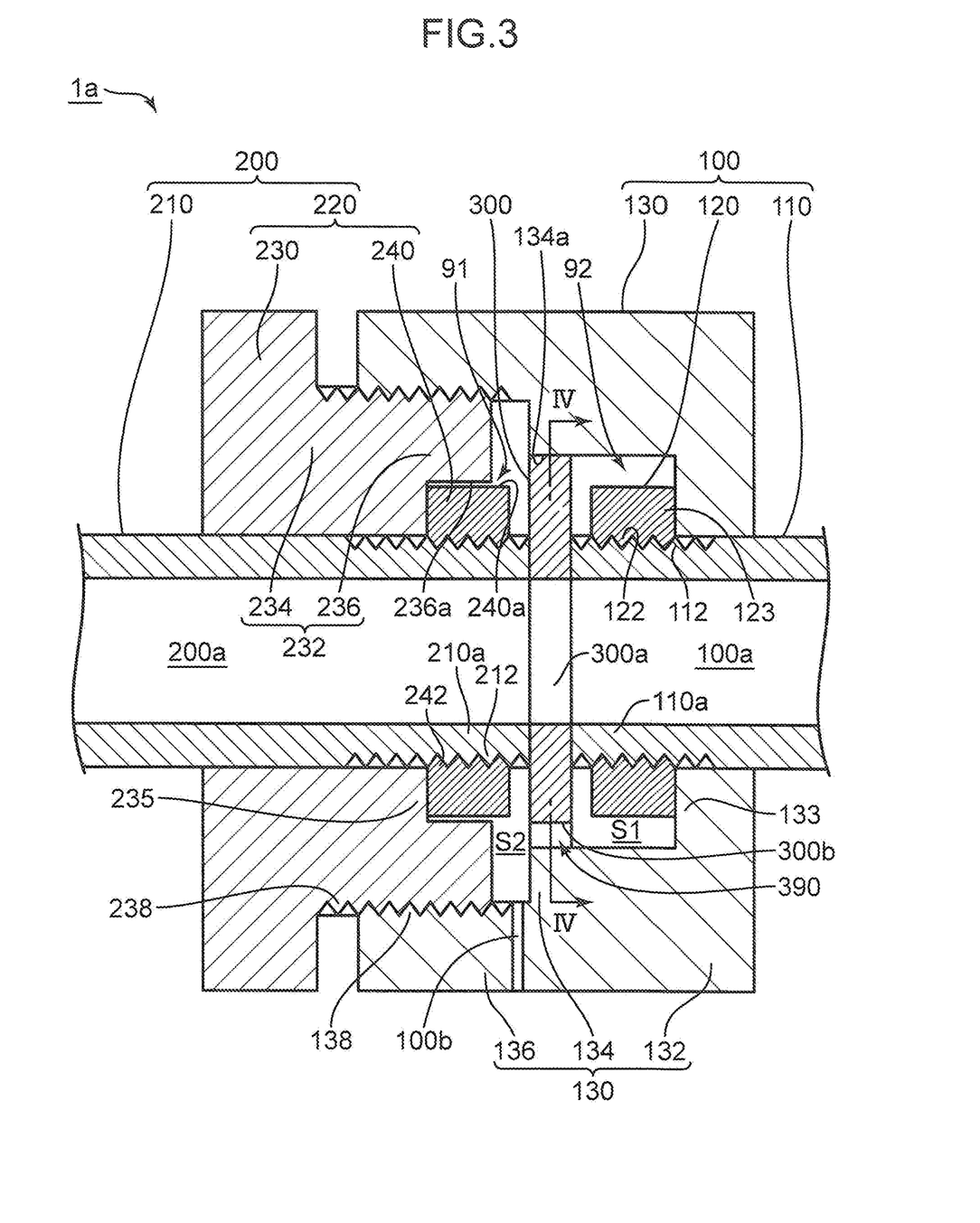
FIG. 3 is a sectional view of a joint unit according to a second embodiment of the present invention.

The first joint member 100 shown in FIG. 3 includes a first pipe portion 110 that forms a first flow path 100a therein, a first collar 120, and a first fastener body 130. The first pipe portion 110 has a male screw portion 112 provided at an outer circumference of a tip end portion 110a of the first pipe portion 110 positioned close to a second pipe portion 210 (i.e., its left end in FIG. 3). The tip end portion 110a has a thickness substantially equal to those of the rest of the first pipe portion 110. In the flow path direction, the entire end surface of the tip end portion 110a of the first pipe portion 110 abuts against the gasket 300. The first pipe portion 110 has an inner diameter that is substantially equal to that of the second pipe portion 210. According to the present embodiment, the male screw portion 112 is a left-handed screw and inversely threaded with respect to the external thread portion 238 of the second fastener body 230.

The first collar 120 has a female screw portion 122 at its inner circumference. The first collar 120 is inserted over the first pipe portion 110, and the female screw portion 122 is engaged with the male screw portion 112. The first fastener body 130 has a female screw portion 138, an abutment portion 133, and a connection path 100b. The female screw portion 138 is formed at a part 136 of the inner circumference of the first fastener body 130 positioned close to the second fastener 220 (i.e., its left part in FIG. 3). The female screw portion 138 is engaged with the external thread portion 238 of the second fastener body 230. The abutment portion 133 extends inward at a part 132 of the first fastener body 130 positioned away from the second fastener 220 (i.e., its right part in FIG. 3). The abutment portion 133 abuts against a part 123 of the first collar 120 positioned away from the second pipe portion 210 (i.e., its right part in FIG. 3) in a direction parallel to the flow path direction. The connection path 100b is a through hole formed through the first fastener body 130 in the perpendicular direction between the female screw portion 138 and the abutment portion 133.

A step portion 134 is formed between the female screw portion 138 and the abutment portion 133 of the first fastener body 130, and the gasket 300 abuts against an inner circumferential surface 134a of the step portion 134 in the perpendicular direction. In this way, the position of the gasket 300 in the perpendicular direction can easily be fixed. The first collar 120 is arranged inside the step portion 134, and a gap 92 is formed between the first collar 120 and the step portion 134 in the perpendicular direction.

Figure 4:
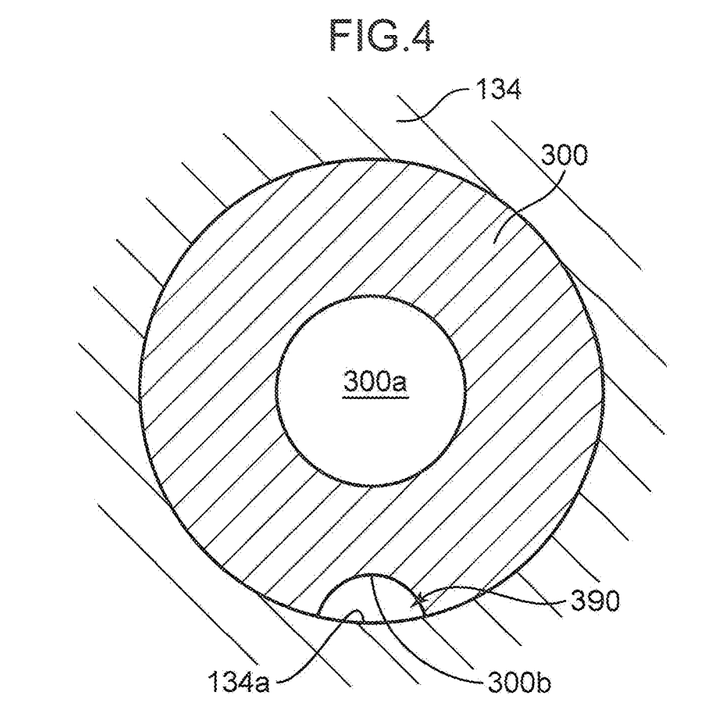
FIG. 4 is a sectional view of a gasket.
Figure 6:
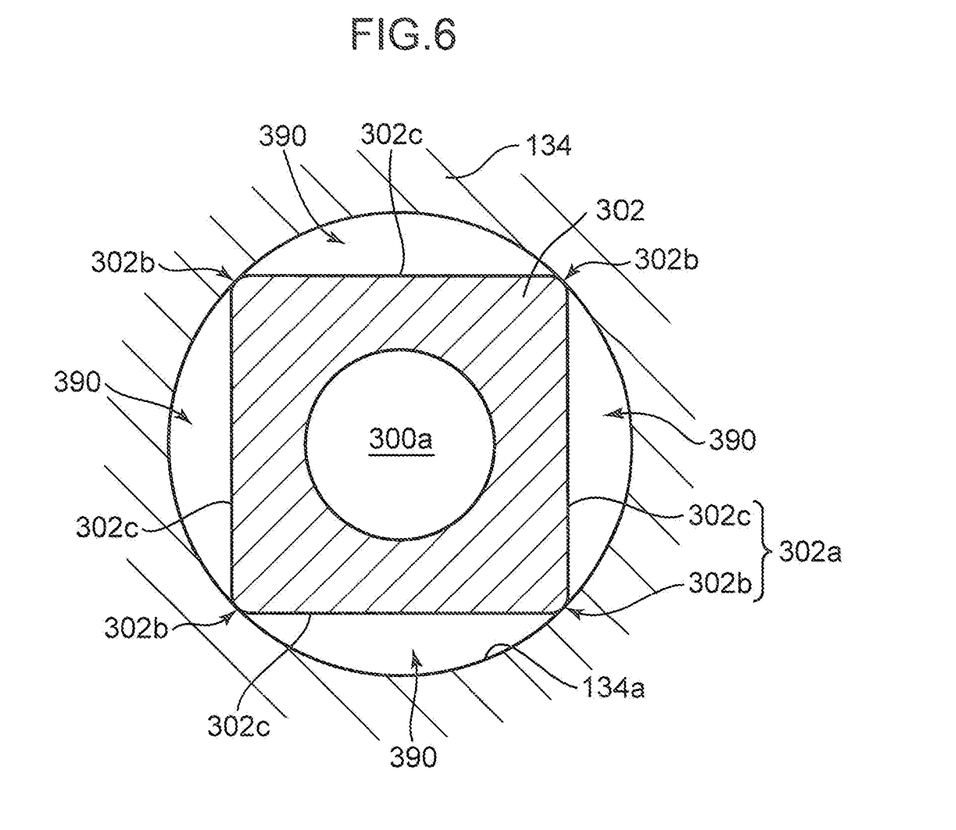
FIG. 6 is a view of a modification of the gasket.
Figure 7:
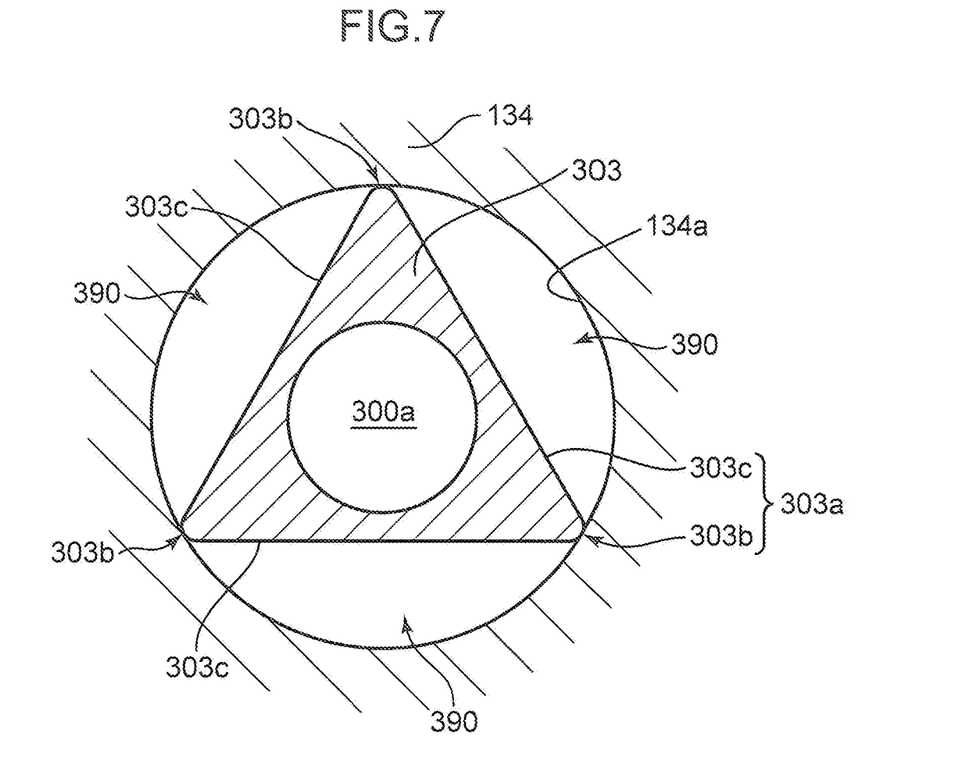
FIG. 7 is a view of a modification of the gasket.

FIG. 4 is a sectional view of the gasket 300 taken along line IV-IV in FIG. 3. FIG. 4 also shows a part of a section of the step portion 134. FIG. 6 and FIG. 7 in the following description are similar sectional views. A communication path forming portion 300b in a notch shape is formed at a part of the outer circumference of the gasket 300. As shown in FIG. 3 and FIG. 4, a communication path 390 is formed between the communication path forming portion 300b and the inner circumferential surface 134a of the step portion 134. As shown in FIG. 3, in the joint unit 1a, the communication path 390 allows a first space S1 and a second space S2 to communicate with each other. The first space S1 is a space surrounded by the first pipe portion 110, the first collar 120, the gasket 300, and the first fastener body 130. The second space S2 is a space surrounded by the second pipe portion 210, the second collar 240, the gasket 300, the second fastener body 230, and the first fastener body 130. The connection path 100b connects the first space S1 and the second space S2 to the outside. Fluid leaking into the first and second spaces S1 and S2 is guided to the connection path 100b, so that checking operation for fluid leakage in the joint unit 1a can be facilitated.

In the joint unit 1a, the external thread portion 238 and the female screw portion 138 are engaged, the female screw portion 242 and the male screw portion 212 are engaged, and the female screw portion 122 and the male screw portion 112 are engaged, so that the first joint member 100 and the second joint member 200 are securely fastened.

When the joint unit 1a is assembled, the first fastener body 130 is fitted to the first pipe portion 110. Then, the first collar 120 is screwed on the male screw portion 112 of the first pipe portion 110, so that the first collar 120 and the abutment portion 133 of the first fastener body 130 abut against each other in a direction parallel to the flow path direction. In the first joint member 100, the first collar 120 and the first pipe portion 110 are fixed by screws, so that the position of the first collar 120 with respect to the first pipe portion 110 in the flow path direction can easily be adjusted.

When the first joint member 100 is assembled, the gasket 300 is arranged in the step portion 134. The step portion 134 serves as a position fixation portion that fixes the position of the gasket 300 in the perpendicular direction. The second fastener body 230 is fitted from the tip end portion 210a of the second pipe portion 210 in parallel with the assembling of the first joint member 100 (or before or after the assembling). Then, the second collar 240 is screwed on the tip end portion 210a, and the second collar 240 is held by the holder 236a of the second fastener body 230.

When the first joint member 100 and the second joint member 200 are assembled, the second fastener body 230 is inserted in the first joint member 100. At the time, the second fastener body 230 is rotated relatively to the first fastener body 130 in a clockwise direction as viewed from the left in FIG. 3. In a direction parallel to the flow path direction, the holder 236a presses the second collar 240 towards the first joint member 100, and the second collar 240 presses the second pipe portion 210 toward the gasket 300 as the internal thread portion 242 and the male screw portion 212 of the second pipe portion 210 are engaged. At the same time, the abutment portion 133 presses the first collar 120 toward the second joint member 200, and the first collar 120 presses the first pipe portion 110 toward the gasket 300 as the female screw portion 122 and the male screw portion 112 of the first pipe portion 110 are engaged. As a result, the second pipe portion 210, the gasket 300, and the first pipe portion 110 are closely contacted with one another.

According to the second embodiment, the second collar 240 and the first collar 120 are provided, so that the first pipe portion 110 and the second pipe portion 210 can be connected through the gasket 300 without the necessity of welding operation. Therefore, assembling operation for the joint unit 1a can be facilitated.

In the joint unit 1a, a very small gap 91 is provided between the second collar 240 and the holder 236a in the perpendicular direction, and such a very small gap 92 is also provided between the first collar 120 and the first fastener body 130. Therefore, in the process of inserting the second fastener body 230, rotation force therefrom can be inhibited from acting upon the second collar 240 and the first collar 120. Furthermore, the external thread portion 238 of the second fastener body 230 and the male screw portion 212 of the second pipe portion 210 are inversely threaded. This prevents the second collar 240 from being loosened with respect to the second pipe portion 210 if friction is caused between the second collar 240 and the second fastener body 230. Similarly, the external thread portion 238 and the male screw portion 112 of the first pipe portion 110 are inversely threaded. Therefore, the first collar 120 can be prevented from being loosened with respect to the first pipe portion 110 if friction is caused between the abutment portion 133 and the first collar 120.

The first collar 120 is covered with the first fastener body 130, so that the total length of the first joint member 100 can be reduced. This also applies to the second joint member 200.

Using the screw fixation, the operation of attaching the second collar 240 to the second pipe portion 210 and the first collar 120 to the first pipe portion 110 can be facilitated.

According to the second embodiment, when the joint unit 1a is assembled, the second joint member 200 may be rotated relatively to the first joint member 100.

Figure 5:
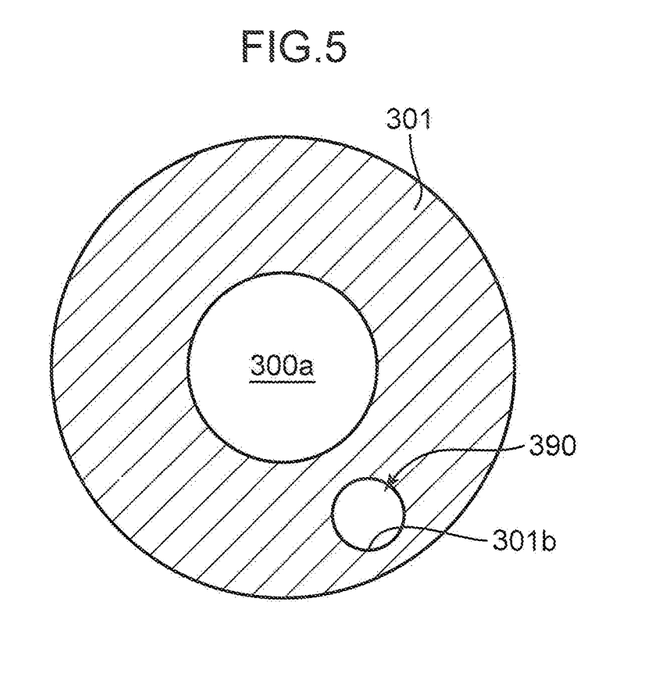
FIG. 5 is a view of a modification of the gasket.

FIG. 5 is a sectional view of another example of a gasket. The gasket 301 has a communication path forming portion 301b formed as a single through hole around an opening 300a. The joint unit 1a is provided with a communication path 390 formed by the communication path forming portion 301b. In this way, the first and second spaces S1 and S2 as shown in FIG. 3 are allowed to communicate with each other, so that fluid leaking into the first and second spaces S1 and S2 can be guided to the outside through the connection path 100b.

FIG. 6 is a sectional view of a modification of the gasket. The gasket 302 has a substantially rectangular outer edge 302a. As the gasket 302 is arranged at the step portion 134, corners 302b of the gasket 302 abut against the step portion 134 in the perpendicular direction. In this way, the position of the gasket 302 in the perpendicular direction can be fixed. In the joint unit 1a, four communication paths 390 are formed by four straight portions 302c of the outer edge 302a positioned between the corners 302b and the inner circumferential surface 134a of the step portion 134. In this way, the straight portions 302c serve as communication path forming portions in the gasket 302.

FIG. 7 is a sectional view of a modification of the gasket. The gasket 303 has a substantially triangular outer edge 303a. Similarly to FIG. 6, the gasket 303 has corners 303b that abut against the inner circumferential surface 134a of the step portion 134 in the perpendicular direction. In the gasket 303, three straight portions 303c are communication path forming portions, and three communication paths 390 are formed between the straight portions 303c and the step portion 134.

As in the foregoing, if the communication forming paths that form communication paths may be provided around the opening 300a, gaskets in various shapes may be employed, and a polygonal gasket having five or more corners may be used. Furthermore, if an outer circumferential surface of a gasket and the step portion 134 of the first joint member 100 abut against each other in two locations with a central axis of the opening 300a therebetween, the gasket may have for example an elliptical shape. This also applies to the first embodiment and the following third embodiment.

Third Embodiment

Now, a joint unit 1b according to a third embodiment of the present invention will be described with reference to FIG. 8.

The joint unit 1b according to the embodiment includes two joint members 400 and 500, a tubular coupling portion 600 that couples the two joint members 400 and 500, and a gasket 300 arranged between the two joint members 400 and 500. Hereinafter, the joint member on the right of the two joint members in FIG. 8 will be referred to as "the first joint member 400" and the member on the left will be referred to as "the second joint member 500." The first joint member 400 has a first pipe portion 410 that forms a first flow path 400a therein and a first fastener 420 in a tubular shape. The first pipe portion 410 has a male screw portion 412 provided at an outer circumference of a tip end portion 410a close the second joint member 500 (i.e., its left end in FIG. 8). The male screw portion 412 is a left-handed screw.

The first fastener 420 is arranged on an outer side of the first pipe portion 410. The first fastener 420 has a first fastener body 430 and a first collar 440 in an annular shape whose outer periphery forms a cylindrical surface. The first collar 440 is positioned closer to the coupling portion 600 than an end of the first fastener body 430 positioned away from the coupling portion 600. The first fastener body 430 has a male screw portion 438 provided at its outer circumference. The male screw portion 438 is a right-handed screw and inversely threaded with respect to the male screw portion 412 of the first pipe portion 410. At a part of the inner circumference of the first fastener body 430 close to the second joint member 500, a holder 436 having an inner diameter greater than those of the rest is provided. The holder 436 holds the first collar 440. An end of the first collar 440 positioned away from the second joint member 500 is in contact with the holder 436 in the flow path direction that coincides with an extending direction of the first pipe portion 410. Note that the flow path direction also coincides with an extending direction of the second pipe portion 510. The first collar 440 has a female screw portion 422 at its inner circumference. The female screw portion 422 of the first collar 440 is engaged with the male screw portion 412 of the first pipe portion 410. A gap 91 is formed between the first collar 440 and the holder 436 in the perpendicular direction, i.e., in a direction perpendicular to the flow path direction.

Figure 8:
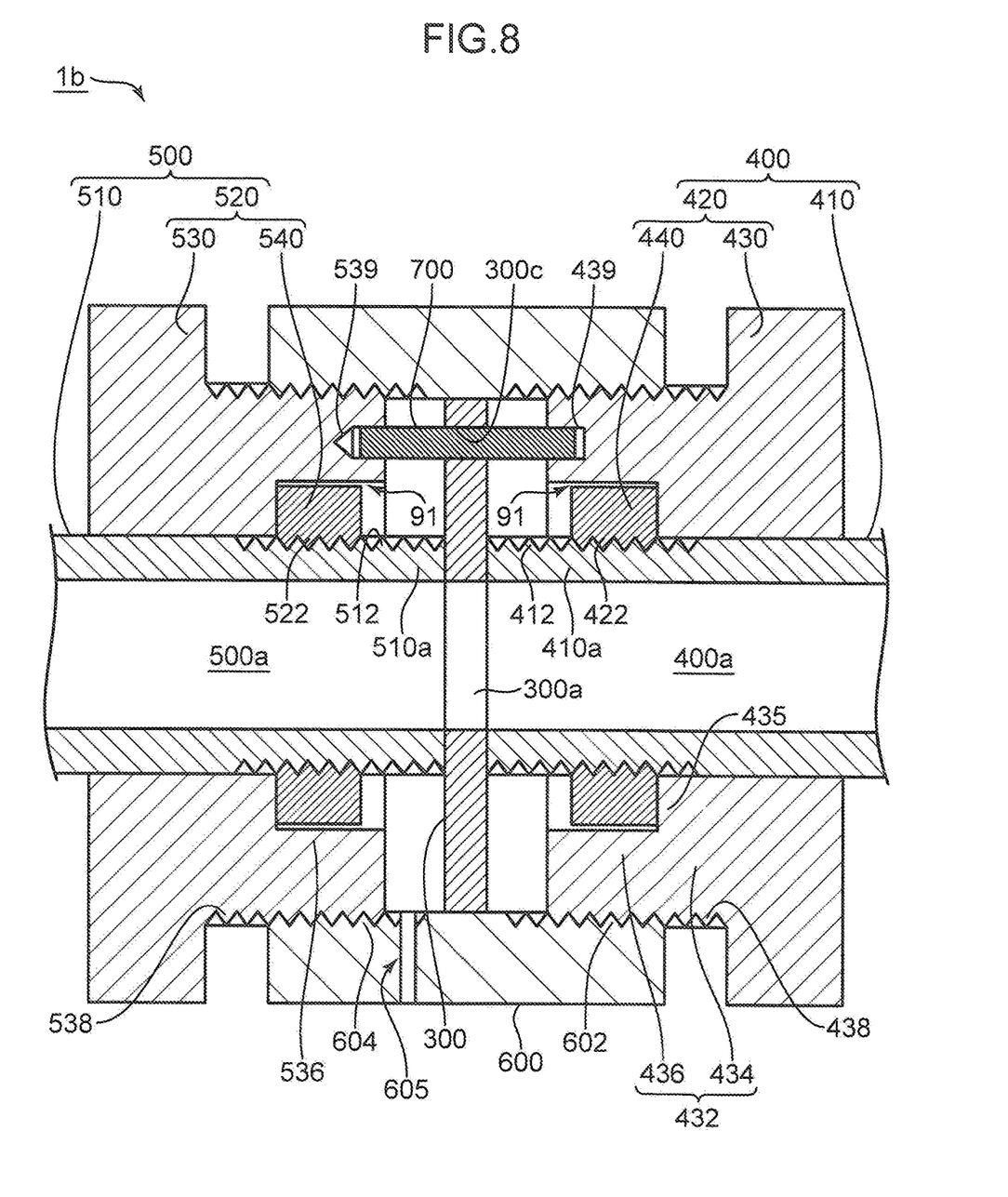
FIG. 8 is a sectional view of a joint unit according to a third embodiment of the present invention.

The second joint member 500 has a structure obtained by inverting the first joint member 400 horizontally in FIG. 8. The second joint member 500 has a second pipe portion 510 that forms a second flow path 500a and a second fastener 520 in a tubular shape. The second pipe portion 510 has a male screw portion 512 provided at an outer circumferential surface of a tip end portion 510a of the second pipe portion 510 positioned close to the first joint member 400 (i.e., its right end in FIG. 8). The male screw portion 512 is a right-handed screw.

The second fastener 520 is arranged on an outer side of the second pipe portion 510. The second fastener 520 has a second fastener body 530 and a second collar 540 in an annular shape whose outer periphery forms a cylindrical surface. The second collar 540 is positioned closer to the coupling portion 600 than an end of the second fastener body 530 positioned away from the coupling portion 600. The second fastener body 530 has a male screw portion 538 provided at its outer circumference. The male screw portion 538 is a left-handed screw and is inversely threaded with respect to the male screw portion 438 of the first fastener body 430 and the male screw portion 512 of the second pipe portion 510. A holder 536 is provided at a part of the inner circumference of the second fastener body 530 close to the first joint member 400, and the second collar 540 is held by the holder 536. An end of the second collar 540 positioned away from the first joint member 400 is in contact with the holder 536 in the flow path direction. The second collar 540 has a female screw portion 522 at its inner circumference. The female screw portion 522 of the second collar 540 is engaged with the male screw portion 512 of the second pipe portion 510. In the perpendicular direction, a gap 91 is formed between the second collar 540 and the holder 536.

The inner peripheral surface of the coupling portion 600 is a cylindrical surface. The coupling portion 600 has a first female screw portion 602, a second female screw portion 604, and a connection path 605. The first female screw portion 602 is provided at a part of the inner circumference of the coupling portion 600 close to the first fastener body 430. The first female screw portion 602 is engaged with the male screw portion 438 of the first fastener body 430. The second female screw portion 604 is provided at a part of the inner circumference of the coupling portion 600 close to the second fastener body 530 and engaged with the male screw portion 538 of the second fastener body 530. The connection path 605 is a through hole formed through the coupling portion 600 in the perpendicular direction in the vicinity of the center.

The gasket 300 has an opening 300a in its center that allows the first flow path 400a and the second flow path 500a to communicate with each other. The gasket 300 has a circular outer edge. The gasket 300 is held from both sides in the flow path direction by the first pipe portion 410 and the second pipe portion 510. In the perpendicular direction, the outer edge of the gasket 300 abuts against a center part of the coupling portion 600. According to the embodiment, the coupling portion 600 serves as a position fixation portion that fixes the position of the gasket 300 in the perpendicular direction. A communication path forming portion 300b similar to that in FIG. 4 is provided around the opening 300a of the gasket 300. In this way, a communication path 390 that connects spaces between the first and second joint members 400 and 500 and the gasket 300 is formed. In this way, fluid leaking into the spaces is guided to the outside through the connection path 605. Note that FIG. 8 shows a section different from a section of the gasket 300 including the communication path forming portion 300b.

As in the foregoing, in the joint unit 1b, the male screw portion 438 of the first fastener body 430 is engaged with the first female screw portion 602 of the coupling portion 600, and the male screw portion 412 of the first pipe portion 410 is engaged with the female screw portion 422 of the first collar 440. The male screw portion 538 of the second fastener body 530 is engaged with the second female screw portion 604 of the coupling portion 600, and the male screw portion 512 of the second pipe portion 510 is engaged with the female screw portion 522 of the second collar 540. In this way, the first joint member 400 and the second joint member 500 are securely fastened.

In the joint unit 1b, a rotation stop pin 700 is inserted in a hole 439 formed at a tip end of the first fastener body 430, a through hole 300c formed around the opening 300a of the gasket 300, and a hole 539 formed at a tip end of the second fastener body 530. In this way, the first joint member 400 can be prevented from rotating relatively to the second joint member 500.

When the joint unit 1b is assembled, the first fastener body 430 is fitted from the tip end portion 410a of the first pipe portion 410. Then, the first collar 440 is screwed on the tip end portion 410a, and the first collar 440 is held by the holder 436 of the first fastener body 430. The second joint member 500 is assembled in the same procedure as the first joint member 400 in parallel with (or before or after) the assembling of the first joint member 400. More specifically, the second fastener body 530 is fitted from the tip end 510a of the second pipe portion 510, and the second collar 540 screwed with the tip end 510a is held by the holder 536 of the second fastener body 530.

Then, the rotation stop pin 700 is inserted into the hole 539 at the tip end portion of the second fastener body 530 and the gasket 300, and the gasket 300 is arranged in the coupling portion 600. A central axis of the first pipe portion 410 is aligned with a central axis of the second pipe portion 510, and the hole 439 of the first fastener body 430 and the rotation stop pin 700 are positioned to overlap in the flow path direction, so that the first fastener body 430 is arranged on the opposite side to the side having the second fastener body 530 with respect to the coupling portion 600.

The coupling portion 600 is rotated relatively to the first and second joint members 400 and 500 in an anticlockwise direction as viewed from the right in FIG. 8. In this way, the first and second fastener bodies 430 and 530 are screwed in the coupling portion 600. In the first joint member 400, the holder 436 of the first fastener body 430 presses the first collar 440 toward the second fastener body 530 in a direction parallel to the flow path direction. The first collar 440 presses the first pipe portion 410 toward the gasket 300 as the female screw portion 422 and the male screw portion 412 of the first pipe portion 410 are engaged. This also applies to the second joint member 500. More specifically, the holder 536 of the second fastener body 530 presses the second collar 540 toward the first fastener body 430 in a direction parallel to the flow path direction. The second collar 540 presses the second pipe portion 510 toward the gasket 300 as the female screw portion 522 and the male screw portion 512 of the second pipe portion 510 are engaged.

In the joint unit 1b, the rotation stop pin 700 is provided, so that the first joint member 400 and the second joint member 500 can be prevented from rotating relatively to each other when the coupling portion 600 is rotated.

As in the foregoing, according to the third embodiment, the first fastener body 430 and the coupling portion 600 are fastened, so that the first collar 440 presses the first pipe portion 410 toward the gasket 300. This also applies to the second fastener body 530. In this way, the first and second collars 440 and 540 are provided, so that the first and second pipe portions 410 and 510 can be connected without the necessity of welding operation, and therefore assembling operation for the joint unit 1b can be facilitated.

The gap 91 is formed between the first collar 440 and the holder 436 and between the second collar 540 and the holder 536 in the perpendicular direction, so that rotation force can be inhibited from acting upon the first and second collars 440 and 540 in the process of assembling the joint unit 1b. The male screw portion 438 of the first fastener body 430 is inversely threaded with respect to the male screw portion 412 of the first pipe portion 410, so that the first collar 440 can be prevented from being loosened with respect to the first pipe portion 410 if friction is caused between the first collar 440 and the first fastener body 430.

In the first collar 440, the female screw portion 422 provided at its inner circumference forms a contact portion in contact with the male screw portion 412 of the first pipe portion 410. In this way, the first collar 440 can easily press the first pipe portion 410 toward the gasket 300. Similarly, in the second collar 540, the female screw portion 522 forms a contact portion in contact with the second pipe portion 510, so that the second collar 540 can easily press the second pipe portion 510. In addition, using the screw fixation, the first collar 440 can easily be attached to the first pipe portion 410. This also applies to the second joint member 500.

According to the third embodiment, when the joint unit 1b is assembled, the first and second joint members 400 and 500 may be rotated relatively to the coupling portion 600. After the coupling portion 600 is provisionally fixed to the second fastener body 530, the rotation stop pin 700 and the gasket 300 may be arranged in the coupling portion 600. While the first fastener body 430, the coupling portion 600, the gasket 300, and the rotation stop pin 700 are provisionally fixed, the second fastener body 530 and the first fastener body 430 may be coupled by the coupling portion 600. In this way, the first joint member 400, the second joint member 500, the coupling portion 600, the gasket 300, and the rotation stop pin 700 may be assembled in various procedures.

While the embodiments of the present invention have been described, the embodiments disclosed herein are to be considered in all respects as illustrative and not restrictive. The scope of the present invention is defined by the appended claims rather than by the description preceding them, and all modifications that fall within the scope of claims and equivalence thereof are intended to be embraced by the claims.

For example, according to the first embodiment, a screw thread oriented in either direction may be employed for the external thread portion 238 of the second fastener body 230 and the male screw portion 212 of the second pipe portion 210 if the screw portions are inversely threaded. According to the second embodiment, a screw thread oriented in either direction may be employed for the external thread portion 238 of the second fastener body 230, the male screw portion 212 of the second pipe portion 210, and the male screw portion 112 of the first pipe portion 110 if the thread portion 238 is inversely threaded with respect to the screw portions 212 and 112. This also applies to the relation between the male screw portion 412 of the first pipe portion 410 and the male screw portion 438 of the first fastener body 430, the relation between the male screw portion 512 of the second pipe portion 510 and the male screw portion 538 of the second fastener body 530, and the relation between the male screw portion 438 of the first fastener body 430 and the male screw portion 538 of the second fastener body 530 according to the third embodiment.

According to the first embodiment, the second fastener body 230 of the second joint member 200 may be provided with a female screw, and the attachment portion 136 of the first joint member 100 may be provided with a male screw to be engaged with the female screw. Also according to the second embodiment, the second fastener body 230 may be provided with a female screw, and the first fastener body 130 of the first joint member 100 may be provided with a male screw to be engaged with the female screw.

According to the first embodiment, the second fastener body 230 may indirectly press the second collar 240 through any other member. A protrusion may be provided at the inner circumference of the second collar 240, and the protrusion may be fitted to a groove provided at an outer surface of the second pipe portion 210, so that the second collar 240 presses the second pipe portion 210. This also applies to the first and second joint members according to the other embodiments.

The gaskets 300 and 301 shown in FIG. 4 and FIG. 5 may be provided with a plurality of communication path forming portions 300b and 301b, respectively.

According to the first embodiment, a connection path formed through the second fastener body 230 in the flow path direction may be provided. This also applies to the second embodiment. According to the third embodiment, a connection path may be provided at the first fastener body 430 or the second fastener body 530.

Now, the embodiments described above will be outlined.

A joint unit according to the embodiment includes a first joint member having a first flow path and a screw portion provided at a part on an outer side than the first flow path, a second joint member having a second flow path and screwed with the first joint member, and a gasket arranged between the first joint member and the second joint member and having an opening that allows the first and second flow paths to communicate with each other. The second joint member includes: a second pipe portion having the second flow path therein; and a second fastener having a tubular shape and arranged on an outer side of the second pipe portion. The second fastener includes: a second fastener body having an external thread portion engaged with the screw portion of the first joint member; and a second collar having an annular shape and positioned closer to the first joint member than an end of the second fastener body positioned away from the first joint member. The second collar includes an inner circumferential portion having a contact portion in contact with an outer surface of the second pipe portion and another contact portion in contact with the second fastener body in an extending direction of the second pipe portion. The second fastener body and the first joint member are fastened, so that the second collar presses the second pipe portion toward the gasket.

In the joint unit, the second collar is provided, so that the first and second joint members are fixed while the second pipe portion is pressed against the gasket. In this way, the pipe portions are attached to the joints for example without welding the pipe portions and the joints together, so that assembling operation for the joint unit can be facilitated.

Furthermore, the second fastener body may include a holder that holds the second collar therein and presses the second collar toward the first joint member, and a gap may be formed between the holder and the second collar in a direction perpendicular to the extending direction of the second pipe portion.

In this way, in the process of inserting the second fastener body into the first joint member, rotation force generated by rotation of the second fastener body can be inhibited from acting upon the second collar. In addition, since the second collar is arranged in the second fastener body, the total length of the second joint member can be reduced.

Furthermore, the second pipe portion may include a male screw portion at an outer circumferential portion thereof, the inner circumferential portion of the second pipe portion may include an internal thread portion engaged with the male screw portion of the second pipe portion, and the internal thread portion and the male screw portion may be engaged, so that the second collar presses the second pipe portion toward the gasket.

In this way, the second collar can easily press the second pipe portion. In addition, the second collar may easily be attached to the second pipe portion, so that assembling operation for the joint unit can be facilitated.

The external thread portion may be a male screw, and the external thread portion and the male screw portion of the second pipe portion may be inversely threaded.

This prevents the second collar from being loosened with respect to the second pipe portion if friction is caused between the second collar and the second fastener body in inserting the second fastener body into the first joint member.

At least one of the first joint member and the second joint member may include a connection path that connects a space between the second fastener and the first joint member to the outside.

In this manner, if fluid leaks out from between the second pipe portion and the gasket, the fluid leakage can be checked by checking the connection path. In this way, checking operation for fluid leakage in the joint unit can be facilitated.

Furthermore, the first joint member may include: a first pipe portion having the first flow path; a first collar into which the first pipe portion is inserted; and a first fastener body that covers the first collar, and the first fastener body may include: the screw portion engaged with the external thread portion; and an abutment portion that extends inward and abuts against a part of the first collar positioned away from the second pipe portion.

The position of the first collar with respect to the first pipe portion is adjusted, and therefore the position of the second joint member with respect to the first joint member can easily be adjusted, so that assembling operation for the joint unit may be more facilitated.

The first pipe portion may have another male screw portion that is inversely threaded with respect to the external thread portion at an end of the first pipe portion positioned on a side close to the second pipe portion, and the first collar may have a female screw portion engaged with the other male screw portion at an inner circumference of the first collar.

In this way, the operation of attaching the first collar to the first pipe portion may be facilitated. In addition, this can prevent the first collar from being loosened with respect to the first pipe portion if friction is caused between the first collar and the first fastener body in inserting the second fastener body into the first joint member.

The gasket may include a communication path forming portion that forms a communication path around the opening, the communication path allows a first space between the gasket and the first collar and a second space between the gasket and the second collar to communicate with each other, and at least one of the first joint member and the second joint member may include a connection path that connects the first and second spaces to the outside.

In this manner, if fluid leaks out from between the second pipe portion and the gasket or between the first pipe portion and the gasket, the fluid leakage can be checked by checking the connection path. Therefore, checking operation for fluid leakage in the joint unit can be facilitated.

Furthermore, the first joint member may include a position fixation portion that fixes the position of the gasket in a direction perpendicular to an extending direction of the first flow path.

In this way, the position of the gasket with respect to the first joint member can easily be adjusted, and assembling operation for the joint unit can be more facilitated.

Furthermore, another joint unit according to the embodiment includes two joint members each having a flow path, a tubular coupling portion that couples the two joint members, and a gasket positioned between the two joint members and having an opening that allows the flow paths of the two joint members to communicate with each other. The two joint members each include: a pipe portion having the flow path therein; and a tubular fastener arranged on an outer side of the pipe portion. The fastener includes: a fastener body including an outer circumferential portion having a male screw portion; and an annular collar positioned closer to the coupling portion than an end of the fastener body positioned away from the coupling portion. The collar includes an inner circumferential portion having a contact portion in contact with an outer surface of the pipe portion and another contact portion in contact with the fastener body in an extending direction of the pipe portion. The male screw portions of the two joint members are inversely threaded with respect to each other. The coupling portion includes an inner circumferential portion having a first female screw portion engaged with the male screw portion of one of the two joint members and a second female screw portion engaged with the other male screw portion. In each of the two joint members, the fastener body and the coupling portion are fastened so that the collar presses the pipe portion toward the gasket.

Also in this joint unit, assembling operation for the joint unit can be facilitated.

Each fastener body may include a holder that holds the collar and presses the collar toward the fastener body of the other joint member, and in each of the two joint members, a gap may be formed between the holder and the collar in a direction perpendicular the extending direction of the pipe portion.

Furthermore, each pipe portion may have another male screw that is inversely threaded with respect to the male screw portion at an outer circumference thereof, and each collar may have another female screw portion engaged with the another male screw.

The gasket may include a communication path forming portion that forms a communication path around the opening, the communication path allows spaces between the gasket and the two joint member to communicate with each other, and the coupling portion or at least one of the two joint members may include a connection path that connects the spaces to the outside.

The invention claimed is:

1. A joint unit, comprising:
   a first joint member having a first flow path formed through the first joint member and a screw portion provided at a part on an outer side than the first flow path;
   a second joint member having a second flow path and screwed with the first joint member; and
   a gasket arranged between the first joint member and the second joint member and having an opening that allows the first and second flow paths to communicate with each other,
   the second joint member including:
     a second pipe portion having the second flow path therein; and
     a second fastener having a tubular shape and arranged on an outer side of the second pipe portion,
   the second fastener including:
     a second fastener body having an external thread portion engaged with the screw portion of the first joint member; and
     a second collar having an annular shape and positioned closer to the first joint member than an end of the second fastener body positioned away from the first joint member,
   the second collar including an inner circumferential portion having a contact portion in contact with an outer surface of the second pipe portion and another contact portion in contact with the second fastener body in an extending direction of the second pipe portion,
   the second fastener body and the first joint member being fastened so that the second collar presses the second pipe portion toward the gasket,
   at least one of the first joint member and the second joint member including a connection path formed of a through hole that connects a space between the second fastener and the first joint member to outside, the connection path being continuously open for checking fluid leaked from the first flow path or the second flow path, and
   the gasket contacting at least one of the first joint member and the second joint member at at least one part of an outer periphery of the gasket,
   the connection path being offset from the gasket in a direction of the first flow path and the second flow path, the first flow path and the second flow path can be used to define a longitudinal direction of the joint unit.

2. The joint unit according to claim 1, wherein the second fastener body includes a holder that holds the second collar therein and presses the second collar toward the first joint member, and
   a gap is formed between the holder and the second collar in a direction perpendicular to the extending direction of the second pipe portion.

3. The joint unit according to claim 1, wherein
   the second pipe portion includes a male screw portion at an outer circumferential portion thereof,
   the inner circumferential portion of the second collar includes an internal thread portion engaged with the male screw portion of the second pipe portion, and
   the internal thread portion and the male screw portion are engaged so that the second collar presses the second pipe portion toward the gasket.

4. The joint unit according to claim 3, wherein
   the external thread portion is a male screw, and
   the external thread portion and the male screw portion of the second pipe portion are inversely threaded.

5. The joint unit according to claim 4, wherein
   the first joint member includes:
     a first pipe portion having the first flow path;
     a first collar having an annular shape into which the first pipe portion is inserted; and
     a first fastener body that covers the first collar, and
   the first fastener body includes:
     the screw portion engaged with the external thread portion; and
     an abutment portion that extends inward and abuts against a part of the first collar positioned away from the second pipe portion.

6. The joint unit according to claim 5, wherein
   the first pipe portion has another male screw portion that is inversely threaded with respect to the external thread portion at an end of the first pipe portion positioned on a side close to the second pipe portion, and
   the first collar has a female screw portion engaged with the other male screw portion at an inner circumferential portion of the first collar.

7. The joint unit according to claim 5, wherein
   the gasket includes a communication path forming portion that forms a communication path around the opening, the communication path allowing a first space between the gasket and the first collar and a second space between the gasket and the second collar to communicate with each other, and
   the connection path connects the first and second spaces to outside.

8. The joint unit according to claim 1, wherein the first joint member has a position fixation portion that fixes a position of the gasket in a direction perpendicular to an extending direction of the first flow path.

* * * * *